United States Patent [19]

Evans

[11] Patent Number: 4,823,920
[45] Date of Patent: Apr. 25, 1989

[54] SLIDING CALIPER DISC BRAKE AND BRAKE SHOE ASSEMBLY THEREFOR

[75] Inventor: Anthony C. Evans, Northville, Mich.

[73] Assignee: Kelsey-Hayes Company, Romulus, Mich.

[21] Appl. No.: 188,939

[22] Filed: May 2, 1988

[51] Int. Cl.$^4$ .............................................. F46D 65/09
[52] U.S. Cl. .............................. 188/73.34; 188/72.4; 188/73.36; 188/73.38; 188/73.39; 188/73.45; 188/205 A; 188/250 G
[58] Field of Search .................... 188/72.4, 72.5, 73.1, 188/72.3, 73.31, 73.32, 73.33, 73.34, 73.35, 73.36, 73.37, 73.38, 73.39, 73.45, 73.44, 205, 206, 250 G, 250 B, 250 E, 250 R

[56] References Cited

U.S. PATENT DOCUMENTS

| | | | |
|---|---|---|---|
| 4,369,862 | 1/1983 | Seki | 188/73.32 X |
| 4,391,355 | 7/1983 | Evans | 188/73.1 X |
| 4,548,300 | 10/1985 | Sheill et al. | 188/73.1 |
| 4,566,564 | 1/1986 | Bolenbaugh et al. | 188/73.1 X |

Primary Examiner—Douglas C. Butler
Attorney, Agent, or Firm—Ralph J. Skinkiss; David Purdue

[57] ABSTRACT

A disc brake assembly with a pivotable caliper is disclosed. The disc brake is a dual pin type, floating caliper disc brake wherein the caliper can be pivoted about one of the pins to facilitate servicing thereof while the caliper remains supported by that pin. Also disclosed is a novel outboard brake shoe assembly including spring clips having a retaining surface for engaging a stop provided on the outboard caliper leg to restrict radial movement of the caliper. The outboard brake shoe assembly can further comprise at least one projection for engaging the outboard caliper leg to restrain undesired circumferential movement of the caliper. The spring clips may further be configured to bias the brake shoe assembly against the caliper to prevent rattle of the brake shoe assembly.

24 Claims, 6 Drawing Sheets

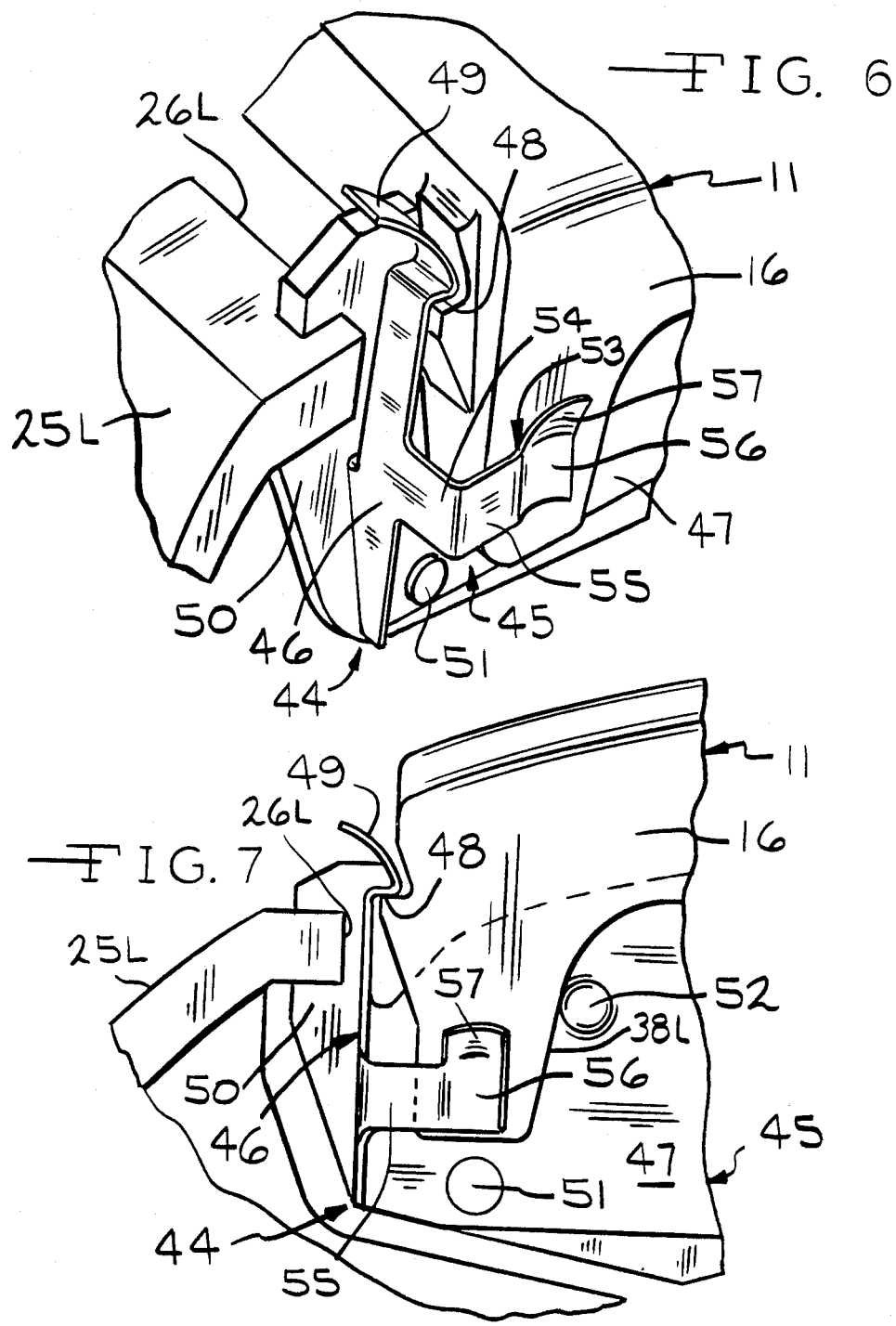

4,823,920

SLIDING CALIPER DISC BRAKE AND BRAKE SHOE ASSEMBLY THEREFOR

BACKGROUND OF THE INVENTION

This invention relates to a disc brake assembly for a vehicle. More particularly, the invention concerns a pin type, floating caliper disc brake wherein the caliper can be pivoted about one of two supporting pins, when the other pin is removed, to facilitate servicing of the brake. The invention is also concerned with a novel outboard brake shoe assembly including means for restraining undesired movement of the caliper which would otherwise occur due to forces transmitted to it during braking.

One type of caliper disc brake in which the caliper can be pivoted for servicing is disclosed in U.S. Pat. No. 3,081,843. The caliper in the disc brake disclosed in this patent is retained in an operative position by two pilot bolts, one of which can be removed to allow the caliper to be pivoted about the remaining bolt to a service position in which it will not interfere with inspection or replacement of the friction pads.

SUMMARY OF THE INVENTION

It is an object of the present invention to provide a disc brake assembly including a caliper which can be pivoted from a service position to an operative position.

Another object of the invention is to provide a disc brake assembly incorporating novel means for restraining undesired movement of the caliper.

Still another object of the invention is to provide a novel brake shoe assembly incorporating novel means for restraining undesired movement of the caliper.

Yet another object of the invention is to provide a novel brake shoe assembly with integral means for biasing it towards an outboard leg of the caliper.

Other objects and features of a disc brake according to the present invention will be recognized from the following detailed description and references therein to the accompanying drawings in which like reference numerals identify like elements throughout.

BRIEF DESCRIPTION OF THE DRAWINGS

FIG. 6 is a perspective view of a portion of a disc brake illustrating a second embodiment of a brake shoe assembly according to the present invention.

FIG. 7 is a front elevational view of the disc brake and brake shoe assembly shown in FIG. 6, as viewed from the outboard side.

DETAILED DESCRIPTION OF THE INVENTION

Figure 1:
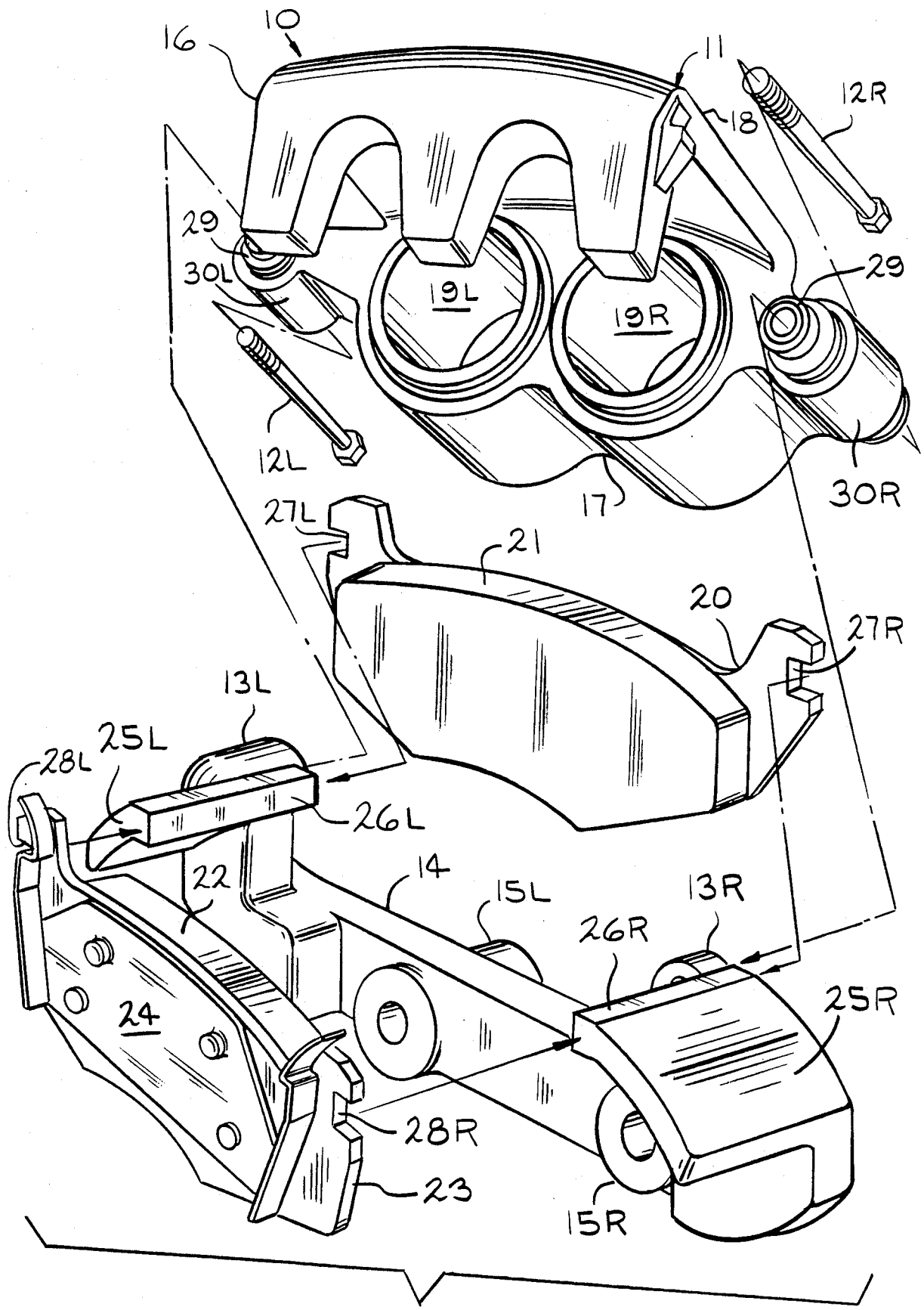
FIG. 1 is an exploded perspective view, partly in diagrammatic form, of a disc brake made pursuant to the teachings of the present invention, as viewed from the outboard side.

Referring now to FIG. 1, a disc brake incorporating the present invention is indicated generally at 10. The disc brake 10 comprises a C-shaped caliper 11 which is adapted to be supported on pins 12L and 12R for sliding movement thereon. The pins 12L and 12R are threaded at one end for engagement in correspondingly threaded apertures (not shown) provided in bosses 13L and 13R formed on an anchor plate 14. Bosses 15L and 15R, with apertures extending therethrough, are provided on the anchor plate 14 for bolting or otherwise securing it directly or indirectly to a vehicle frame member F (FIGS. 3 and 4) or a wheel spindle (not shown) or another suitable vehicle component. Thus, the caliper is supported for limited axial sliding movement relative to the anchor plate 14.

The caliper 11 comprises a front or outboard leg 16 and a rear or inboard leg 17 interconnected by a caliper bridge 18. Brake actuation means including hydraulically actuated pistons 19L and 19R are slidably mounted in actuating cylinders (not shown) carried by the inboard leg 17. The actuating cylinders and the pistons 19L and 19R have axes which are parallel to each other, and, when the disc brake 10 is installed over a rotor D (FIG. 2), these axes will be parallel to the axis of rotation of the rotor D. The pistons 19L and 19R (FIG. 1) engage a backing plate 20 of an inboard friction pad 21 for direct actuation thereof when hydraulic fluid is introduced under pressure into the actuating cylinders. An outboard friction pad 22 is indirectly actuated by reaction of the outboard leg 16 of the caliper 11. This reaction is transmitted to the outboard friction pad 22 through a backing plate 23 and a caliper retaining plate 24.

Figure 2:
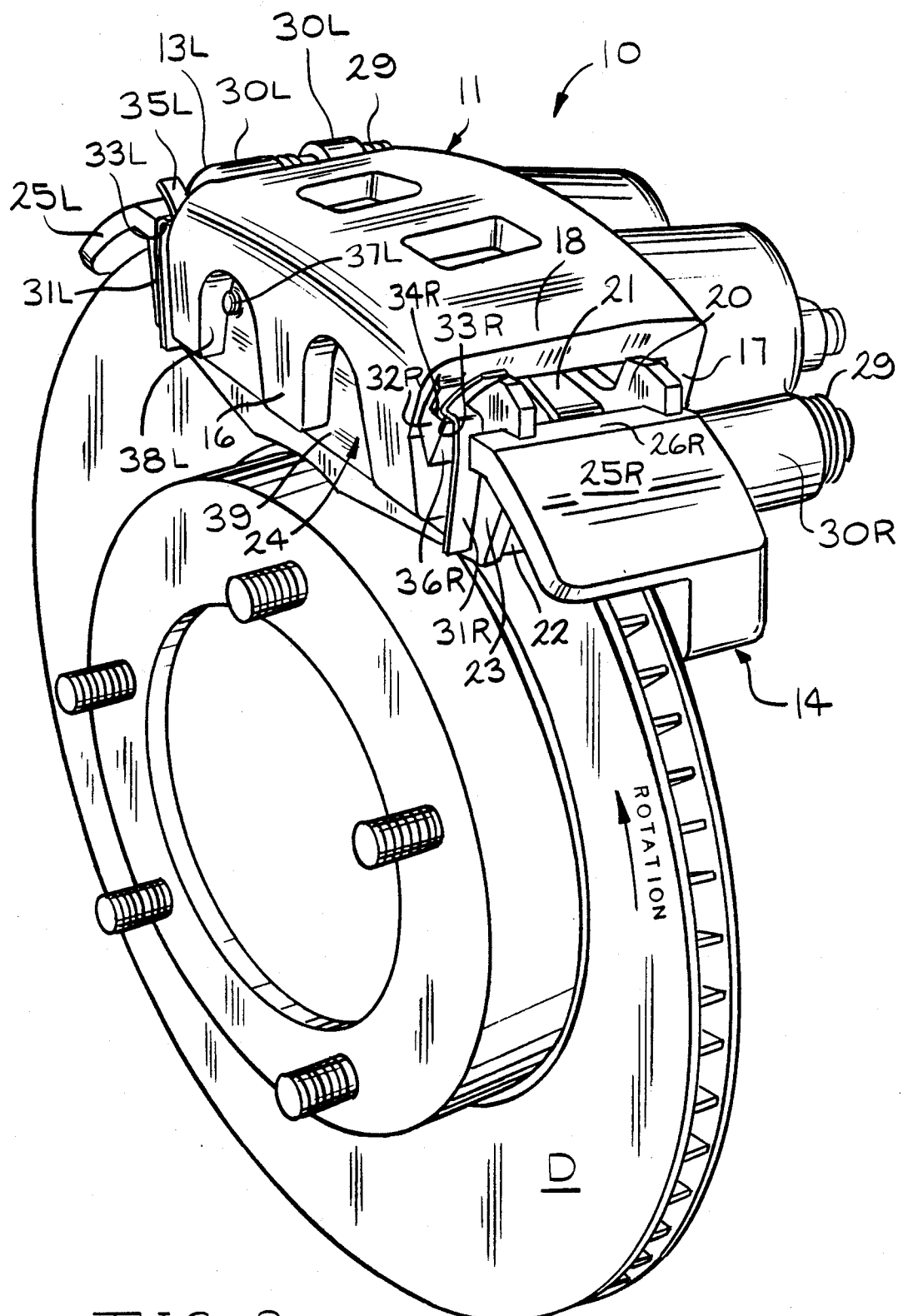
FIG. 2 is a perspective view of the disc brake shown in FIG. 1, assembled, as viewed from the outboard side.

The anchor plate 14 has two arms 25L and 25R which extend in a direction parallel to the axis of the rotor D. As shown in FIG. 2, the arms 25L and 25R extend from the anchor plate 14 on the inboard side of the rotor D, over the periphery of the rotor D. The arms 25L and 25R support the inboard friction pad backing plate 20 and the outboard friction pad backing plate 23 for sliding movement along anchor plate rail guides 26L and 26R by engagement thereof with inboard backing plate guide notches 27L and 27R and outboard backing plate guide notches 28L and 28R. By this construction, torque created by braking friction is transferred through the backing plates 20 and 23, to and through the anchor plate 14 to a vehicle frame F. The caliper 11 serves primarily as the means for applying clamping forces to the brake shoe assemblies without having imparted thereto a substantial amount of braking torque.

The caliper 11, as shown in FIG. 2, is supported on the pins 12L and 12R (FIG. 1) for limited sliding movement relative to the anchor plate 14. Bushings 29 are supported in apertures formed in bosses 30L and 30R provided on the inboard leg 17 of the caliper 11. The pins 12L and 12R extend through the bushings 29 and one end is secured in apertures in the anchor plate bosses 13L and 13R. In this way, the caliper "floats" on the pins 12L and 12R relative to the anchor plate 14.

Figure 3:
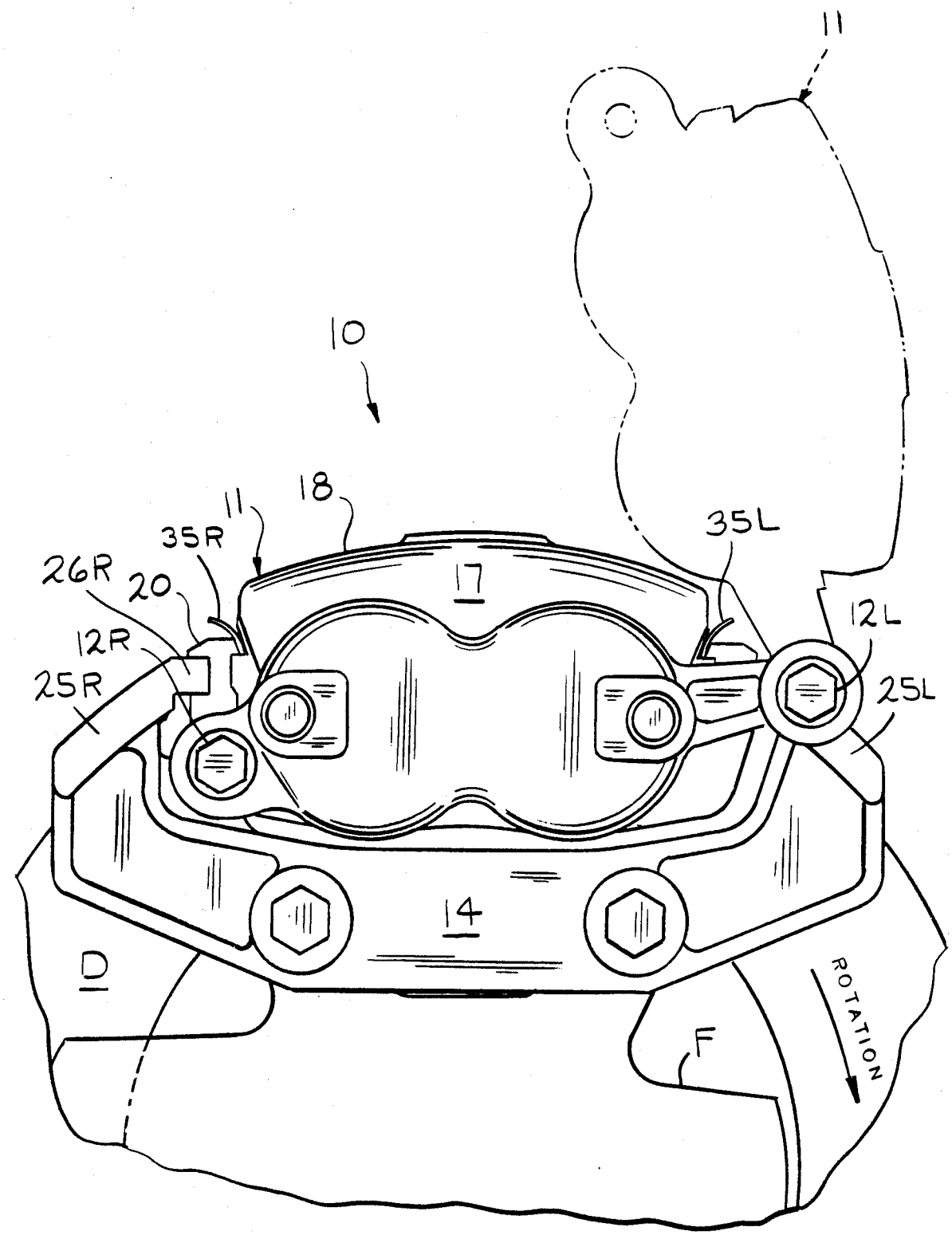
FIG. 3 is a rear elevational view of the disc brake shown in FIG. 1, as viewed from the inboard side.
Figure 4:
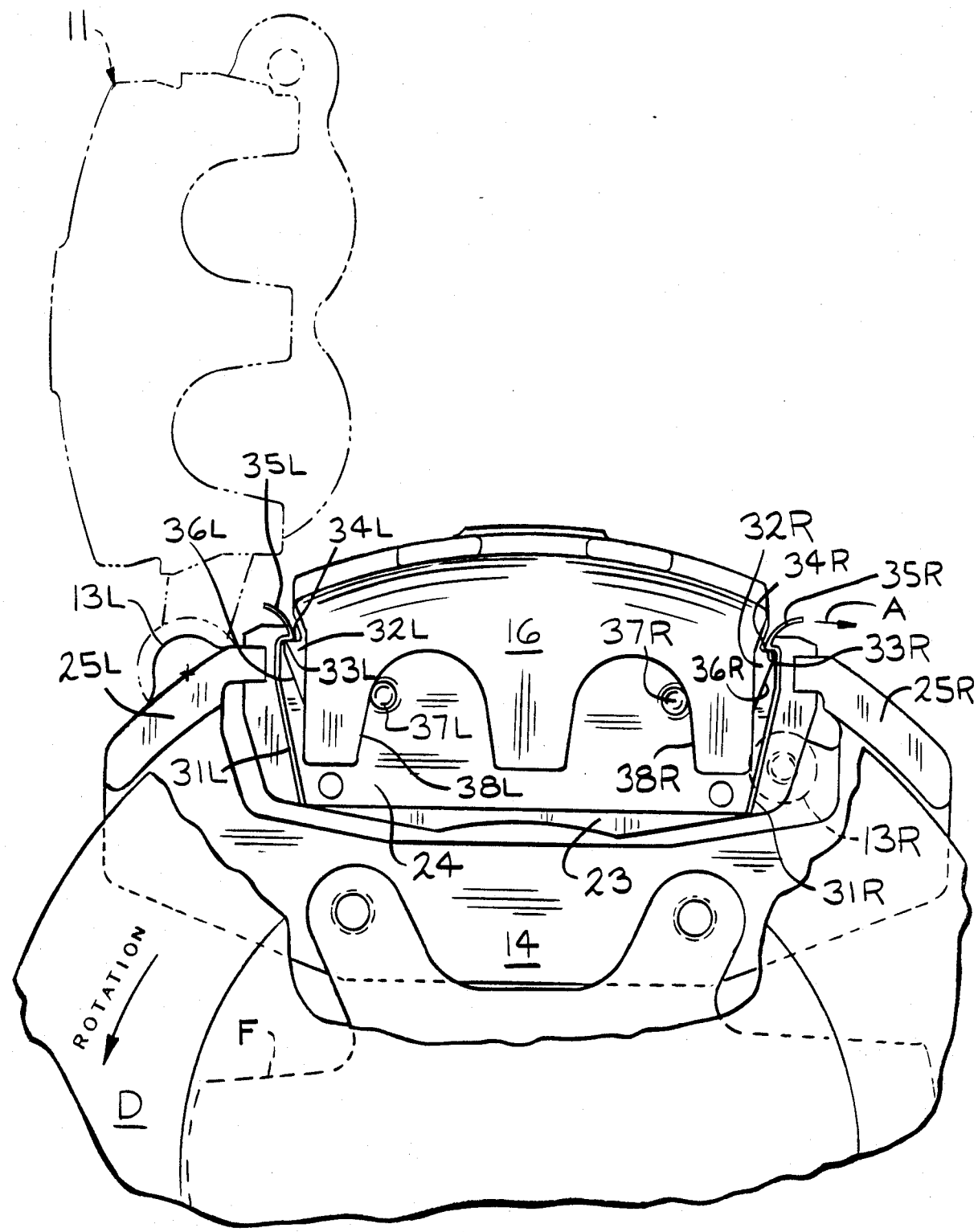
FIG. 4 is a front elevational view, partially broken away, of the disc brake shown FIG. 1, as viewed from the outboard side.

The caliper 11 can be rotated about the pin 12L from the operative position illustrated in FIGS. 3 and 4 to a service position illustrated by broken lines in FIGS. 3 and 4. In the service position, the caliper 11 is supported for rotation about the bushing 29. This construction greatly facilitates the servicing of the disc brake 10 by enabling the replacement of the brake shoe assemblies without the need to remove the caliper 11 completely. Furthermore, once the disc brake has been serviced, the job of reinstalling the caliper 11 is much easier than if the entire caliper 11 had been removed from the anchor plate 14.

With the caliper 11 pivoted to the service position, the brake shoe assemblies can be removed and replaced with great facility. Specifically, the brake shoe assembly comprising outboard friction pad 22, outboard friction pad backing plate 23 and caliper retaining plate 24 is moved axially in an outboard direction until the outboard backing plate guide notches 28L and 28R become disengaged from the anchor plate rail guides 26L and 26R. The brake shoe assembly comprising the inboard friction pad 21 and the inboard friction pad backing plate 20 is moved axially in an inboard direction until the inboard backing plate guide notches 27L and 27R become disengaged from the anchor plate rail guides 26L and 26R. The process is reversed with new brake shoe assemblies, the caliper 11 is pivoted back to the operative position and the pin 12R is replaced to complete the operation.

Figure 5:
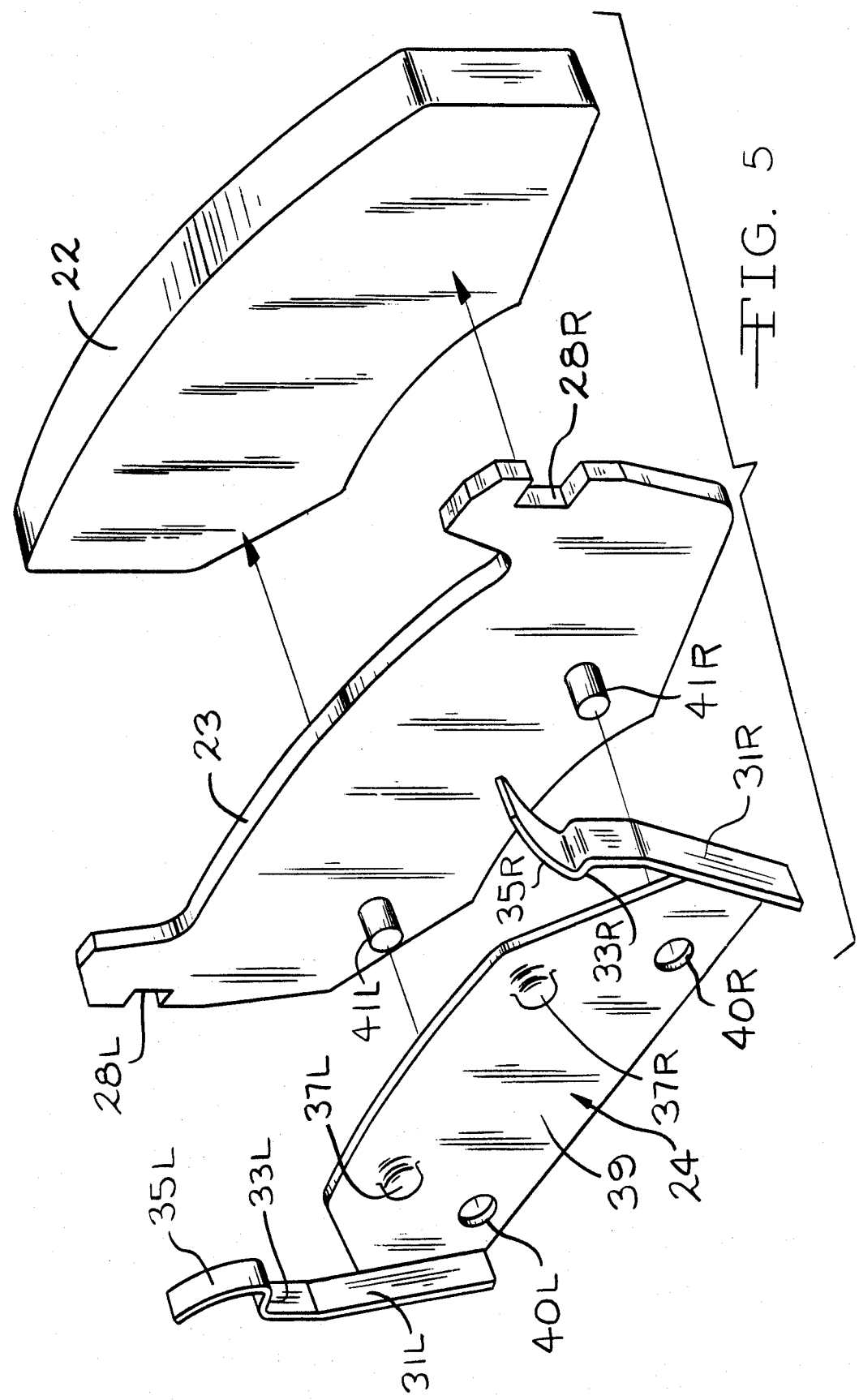
FIG. 5 is an exploded perspective view, partly in diagrammatic form, of a brake shoe assembly including a retaining plate according to one embodiment of the present invention.

As shown in FIGS. 2, 4 and 5, the caliper retaining plate 24, preferably formed from spring steel, includes spring clips 31L and 31R, portions of which engage stops 32L and 32R (FIGS. 2 and 4) provided on the outboard leg 16 of the caliper 11. Specifically, abutment engaging surfaces 33L and 33R are formed in the spring clips 31L and 31R to engage surfaces 34L and 34R formed on the caliper stops 32L and 32R when the caliper 11 is in the operative position. The interactions between the abutment engaging surfaces 33L and 33R on the one hand, and the surfaces 34L and 34R, on the other hand, restrain the caliper 11 from radial movement. Forces which would tend to cause such movement are reacted in the anchor plate 14 by transmission thereto through the spring clip 31L or 31R, the outboard friction pad backing plate 23 and the anchor plate rail guides 26L and 26R.

The spring clips 31L and 31R are flexible to the extent that a free end adjacent to the abutment engaging surfaces 33L and 33R can be manually deflected in the direction of arrow A (FIG. 4) until the abutment engaging surface 33R disengages the surface 34R to permit the caliper 11, when pin 12R is removed, to pivot from the operative position to the service position. In the illustrated embodiments, ramp surfaces 35L and 35R are provided on the spring clips 31L and 31R, respectively. The ramp surface 35R is adapted to cooperate with a ramp surface 36R provided on the stop 32R so that, as the caliper is pivoted from the service position to the operative position, the free end of the spring clip 31R will be deflected to the right, in FIG. 4, until the abutment engaging surface 33R clears the stop 32R, whereupon the spring clip 31R will snap into the position illustrated for it in FIG. 4. In this position, abutment engaging surface 33R engages caliper surface 34R to restrain radial movement of the caliper 11. As a practical matter, such restraint need only be provided on the edge of the caliper 11 that trails when the rotor D is rotating.

The caliper retaining plate 24 is provided with projections 37L and 37R which extend from a major surface 39 of the plate 24 in an outboard direction. The projections 37L and 37R may be formed by stamping or any other suitable means. As shown in FIG. 4, the projections 37L and 37R are positioned to engage circumferentially spaced caliper guide surfaces 38L and 38R, respectively, provided on the outboard leg 16 of the caliper 11, when it is in the operative position Such engagement restrains the caliper 11 from undesired circumferential movement. Ultimately, forces which would cause such movement are reacted in the anchor plate 14, by transmission thereof through the projection 37L or 37R, the caliper retaining plate 24 and the outboard friction pad backing plate 23 to the anchor plate rail guide 26L or 26R. Neither the projections 37L and 37R nor the caliper guide surfaces 38L and 38R interfere with the caliper 11 as it is rotated between the operative position and the service position.

FIG. 5 illustrates further details of the preferred structure of a brake shoe assembly including the caliper retaining plate 24 according to the present invention. The brake shoe assembly comprises the outboard friction pad 22, the outboard friction pad backing plate 23 and the caliper retainer plate 24. The friction pad 22 is bonded to the backing plate 23 by means of any suitable bonding agent and according to any suitable technique. Alternatively, the friction pad 22 may be integrally molded upon the backing plate 23. The caliper retaining plate 24 is formed with two spring clips 31L and 31R extending at substantially right angles from a major surface 39 of the plate 24. Apertures 40L and 40R are formed in the plate 24 and they are positioned to align with a pair of protrusions 41L and 41R extending from the backing plate 23 for mechanically securing it to the retaining plate 24 and vice-versa. A noise insulating coating (not shown) may be provided on the major surface 39 of the retaining plate 24. The function of the projections 37L and 37R could alternatively be served by a second pair of projections extending outwardly from the major surface 39 of the caliper retaining plate 24 to engage the circumferential caliper guide surfaces 38L and 38R. Such a second pair of protrusions might also serve to secure the caliper retaining plate 24 to the backing plate 23, instead of or in combination with protrusions 41L and 41R.

FIGS. 6 and 7 show an alternative embodiment of my invention, similar to that shown in FIG. 5. A retaining plate 45 includes a composite spring clip 46 positioned at each end of the retaining plate 45, extending at substantially right angles from a major surface 47. Each spring clip 46 includes an abutment engaging surface 48 and a ramp surface 49. Plate 45 is mechanically secured to a friction pad backing plate 50 by means of rivets 51. Projections 52 (FIG. 7) extend outwardly from the major surface 47 of the retaining plate 45 to engage circumferential caliper guide surfaces 38L. As described thus far, the retaining plate 45 is substantially similar to the retaining plate 24 as shown in FIG. 5.

The composite spring clip 46 of the retaining plate 45 additionally comprises means including a composite flange 53 for positioning and retaining the outboard brake shoe assembly tightly against the outboard leg 16 of the caliper 11. The composite flange 53 is an integral extension of the spring clip 46 with a leg 54 extending therefrom a short distance in the outboard direction to another leg 55 which extends therefrom towards the outboard leg 16 of the caliper 11 and terminates in a caliper engaging portion 56. A caliper guide ramp 57 extends upwardly and in an outboard direction from the caliper engaging portion 56. The guide ramp 57 serves to initially position the brake shoe assembly relative to the outboard leg 16 of the caliper 11. In addition to restraining circumferential and radial movement of the caliper 11, the retaining plate 45 serves an anti-rattle function by biasing the outboard brake shoe assembly into close contact with the outboard leg 16 of the caliper 11. Although only one end of the retaining plate 45 is illustrated in FIGS. 6 and 7, the opposite end is a mirror image of the illustrated end.

The hydraulic actuation means illustrated in FIGS. 1-4 include a dual piston and cylinder arrangement. A single piston and cylinder hydraulic actuator would be equally well suited for incorporation in a disc brake according to the present invention. The foregoing description sets forth the preferred embodiments of this invention and is calculated to enable those skilled in the art to practice the invention. Modifications and alterations may occur to those skilled in the art but fall, nonetheless, within the spirit and scope of the appended claims.

I claim:

1. A disc brake assembly for applying a braking force to a rotatable disc having an axis of rotation and an inboard and an outboard frictional surface, said disc brake assembly comprising
    a rigid stationary member inboard of said disc and having two circumferentially spaced torque receiving arms axially extending above and across the periphery of said rotatable disc,
    first and second pin members releasably and rigidly fixed to said stationary member and extending parallel to the axis,
    a caliper having an inboard leg and an outboard leg, said caliper being supportable in an operative position on said pin members for limited sliding movement thereon,
    an inboard brake shoe assembly including an inboard backing plate and a friction pad secured thereto, said inboard backing plate being supportable on said torque receiving arms, on the inboard side of said disc, for axial sliding movement, so that braking torque is transferred to said torque arms,
    an outboard brake shoe assembly including an outboard backing plate, a friction pad secured to one side thereof and radial caliper retaining means movable between a first position in which said means are operable and a second position in which said means are inoperable to engage a stop on said caliper and to restrain radially outward movement of said caliper when it is supported on said pin members, said outboard backing plate being supportable on said torque receiving arms, on the outboard side of said disc, for axial sliding movement, so that braking torque is transferred to said torque arms,
    brake actuation means mounted on said caliper for applying an axial force to said inboard backing plate to urge said inboard friction pad into frictional engagement with said disc thereby causing axial movement of said caliper so that said outboard leg of said caliper urges said outboard friction pad into engagement with said disc,
    wherein, when the second pin is released from said rigid stationary member and said radial caliper retaining means are in the second position, said caliper is free to rotate about said first pin from the operative position to a service position and
    wherein, when said caliper is in the service position, it does not interfere with the removal of the inboard brake shoe assembly and the outboard brake shoe assembly from the torque receiving arms.

2. The disc brake assembly claimed in claim 1 wherein said radial caliper retaining means comprises a retaining plate fixed to said outboard backing plate, said retaining plate comprising at least one spring clip including a stop engaging surface for engaging said stop on said caliper.

3. The disc brake assembly claimed in claim 2 wherein said spring clip is flexible and resilient so that a free end thereof can be deflected from a first position to a second position in which the stop engaging surface is disengaged from said caliper stop.

4. The disc brake assembly claimed in claim 3 and further comprising first and second ramp means provided on said caliper and said spring clip, respectively, for causing deflection of said free end of said spring clip from the first position to the second position as said caliper is pivoted from the service position to the operative position, wherein, when said caliper reaches the operative position, said free end of said spring clip snaps back to the first position so that said stop engaging surface engages said caliper stop.

5. A disc brake assembly for applying a braking force to a rotatable disc having an axis of rotation and an inboard and an outboard frictional surface, said disc brake assembly comprising
    a rigid stationary member inboard of said disc and having two circumferentially spaced torque receiving arms axially extending above and across the periphery of said rotatable disc,
    first and second pin members releasably and rigidly fixed to said stationary member and extending parallel to the axis,
    a caliper having an inboard leg and an outboard leg, said caliper being supportable in an operative position on said pins for limited sliding movement thereon,
    an inboard brake shoe assembly including an inboard backing plate and a friction pad secured thereto, said inboard backing plate being supportable on said torque receiving arms, on the inboard side of said disc, for axial sliding movement, so that braking torque is transferred to said torque arms,
    an outboard brake shoe assembly including an outboard backing plate, a friction pad secured to one side thereof, and caliper retaining means operable in a first position and inoperable in a second position, when the caliper is supported on said first and second pin members, to restrain said caliper from moving radially outwardly, said caliper retaining means being further operable, when the caliper is supported on said pin members, to restrain undesired circumferential movement thereof, said caliper retaining means being further operable to transmit forces which would cause radially outward or circumferential movement of said caliper to said torque receiving arms, said outboard backing plate being supportable on said torque receiving arms, on the outboard side of said disc, for axial sliding movement, so that braking torque is transferred to said torque arms,
    brake actuation means mounted on said caliper for applying an axial force to said inboard backing plate to urge said inboard friction pad into frictional engagement with said disc thereby causing axial movement of said caliper so that said outboard leg of said caliper urges said outboard friction pad into engagement with said disc, wherein, when the second pin is released from said rigid stationary member and said caliper retaining means are in the second position, said caliper is free to rotate about said first pin from the operative position to a service position and wherein, when said caliper is in the service position, it does not interfere with the removal of the inboard brake shoe assembly and the outboard brake shoe assembly from the torque receiving arms.

6. The disc brake assembly as claimed in claim 5 wherein said caliper retaining means comprise a retaining plate fixed to said outboard backing plate and said retaining plate comprises at least one spring clip with a stop engaging surface, said spring clip being movable between a first position in which its surface engages and a second position in which its surface does not engage a stop on the outboard leg of the caliper to restrain radially outward movement of the caliper when it is supported on the first and second pins, said retaining plate further comprising projections extending in an axial direction from a major surface of the retaining plate into engagement with the outboard leg of the caliper to restrain circumferential movement of the caliper when it is supported on said first and second pins.

7. The disc brake assembly claimed in claim 6 wherein said spring clip is flexible and resilient so that a free end thereof can be deflected from the first position to the second position to disengage said stop engaging surface from said caliper stop.

8. The disc brake assembly claimed in claim 7 and further comprising first and second ramp means provided on said caliper and said spring clip, respectively, for causing deflection of said free end of said spring clip from the first position to the second position as said caliper is pivoted from the service position to the operative position, wherein, when said caliper reaches the operative position, said free end of said spring clip snaps back to the first position so that said stop engaging surface engages said caliper stop.

9. A disc brake assembly for applying a braking force to a rotatable disc having an axis of rotation and an inboard and an outboard frictional surface, said disc brake assembly comprising a rigid stationary member inboard of said disc and having two circumferentially spaced torque receiving arms axially extending above and across the periphery of said rotatable disc, first and second pin members releasably and rigidly fixed to said stationary member and extending parallel to the axis, a caliper having an inboard leg and an outboard leg, said caliper being supportable in an operative position on said pins for limited sliding movement thereon, an inboard brake shoe assembly including an inboard backing plate and a friction pad secured thereto, said inboard backing plate being supportable on said torque receiving arms, on the inboard side of said disc, for axial sliding movement, so that braking torque is transferred to said torque arms, an outboard brake shoe assembly including an outboard backing plate, a friction pad secured to one side thereof, and a caliper retaining plate fixed to the other side thereof, said outboard backing plate being supportable on said torque receiving arms, on the outboard side of said disc, for axial sliding movement, so that braking torque is transferred to said torque arms, said retaining plate comprising a spring clip including a stop engaging surface for engaging a stop on said caliper to restrain radially outward movement thereof and at least one projection extending in an outboard direction from a major surface of said retaining plate to engage the outboard leg of said caliper to restrain circumferential movement thereof, brake actuation means mounted on said caliper for applying an axial force to said inboard backing plate to urge said inboard friction pad into frictional engagement with said disc thereby causing axial movement of said caliper so that said outboard leg of said caliper urges said outboard friction pad into engagement with said disc, wherein, when the second pin is released from said rigid stationary member and the stop engaging surface of said spring clip is disengaged from said caliper stop, said caliper is free to rotate about said first pin from the operative position to a service position and wherein, when said caliper is in the service position, it does not interfere with the removal of the inboard brake shoe assembly and the outboard brake shoe assembly from the torque receiving arms.

10. The disc brake assembly claimed in claim 9 wherein said spring clip is flexible and resilient so that a free end thereof can be deflected from a first position in which the stop engaging surface engages to a second position in which the stop engaging surface does not engage said caliper stop.

11. The disc brake assembly claimed in claim 10 and further comprising first and second ramp means provided on said caliper and said spring clip, respectively, for causing deflection of said free end of said spring clip from the first position to the second position as said caliper is pivoted from the service position to the operative position, wherein, when said caliper reaches the operative position, said free end of said spring clip snaps back to the first position so that said stop engaging surface engages said caliper stop.

12. A brake shoe assembly for a caliper disc brake comprising a rotatable disc having an axis of rotation and an inboard and an outboard frictional surface, a rigid stationary member inboard of said disc and having two circumferentially spaced torque receiving arms axially extending above and across the periphery of the disc, first and second pin members rigidly fixed to the stationary member, a caliper slidably mounted on the pins, and at least one stop provided on the caliper, said brake shoe assembly comprising, a friction pad backing plate, guide means associated with said backing plate for supporting the brake shoe assembly for sliding movement on said torque receiving arms, a friction pad mounted on and secured to said friction pad backing plate and stop engaging means including a flexible and resilient spring clip having a surface for engaging the caliper stop when the caliper is mounted on the pins and restraining undesired radially outward movement of said caliper, said stop engaging means being fixed to and integral with said friction pad backing plate.

13. The brake shoe assembly claimed in claim 12 wherein said stop engaging means further includes a ramp surface on said spring clip for cooperating with a corresponding ramp surface on the caliper, when the caliper is pivoted about the first pin from a service position to an operative position, to deflect the spring clip so that it does not interfere with the caliper as it is so pivoted.

14. The brake shoe assembly claimed in claim 13 and further comprising circumferential caliper retaining means for restraining undesired movement of said caliper in a circumferential direction by transmitting forces that would cause such movement through the backing plate to said stationary member.

15. The brake shoe assembly claimed in claim 14 wherein said circumferential caliper retaining means comprises at least one projection extending from a major surface of said brake shoe assembly.

16. The brake shoe assembly claimed in claim 12 and further comprising a retaining flange for engaging a portion of a caliper leg and biasing the brake shoe assembly tightly thereagainst.

17. A brake shoe assembly for a caliper disc brake comprising a rotatable disc having an axis of rotation and an inboard and an outboard frictional surface, a rigid stationary member inboard of said disc and having two circumferentially spaced torque receiving arms axially extending above and across the periphery of the disc, first and second pin members rigidly fixed to the stationary member, a caliper slidably mounted on the pins, and at least one stop provided on the caliper, said brake shoe assembly comprising,
 a friction pad backing plate,
 guide means associated with said backing plate for supporting the brake shoe assembly for sliding movement on said torque receiving arms,
 a friction pad mounted on and secured to said friction pad backing plate and
 a caliper retaining plate fixed to said backing plate and including a flexible and resilient spring clip having a surface for engaging the caliper stop when the caliper is mounted on the pins and restraining undesired radially outward movement of said caliper by transmitting forces that would cause such movement through said friction pad backing plate to said stationary member.

18. The brake shoe assembly claimed in claim 17 wherein said spring clip includes a ramp surface for cooperating with a corresponding ramp surface on the caliper, when the caliper is pivoted about the first pin from a service position to an operative position, to deflect the spring clip so that it does not interfere with the caliper as it is so pivoted.

19. The brake shoe assembly claimed in claim 18 and further comprising caliper engaging projections extending from a major surface of said brake shoe assembly for restraining undesired movement of said caliper in a circumferential direction by transmitting forces that would cause such movement through the backing plate to said stationary member.

20. The brake shoe assembly claimed in claim 16 and further comprising a retaining flange for engaging a portion of a caliper leg and biasing the brake shoe assembly tightly thereagainst.

21. A brake shoe assembly for a caliper disc brake comprising a rotatable disc having an axis of rotation and an inboard and an outboard frictional surface, a rigid stationary member inboard of said disc and having two circumferentially spaced torque receiving arms axially extending above and across the periphery of the disc, first and second pin members rigidly fixed to the stationary member, a caliper slidably mounted on the pins, and first and second stops provided on the caliper, said brake shoe assembly comprising,
 a friction pad backing plate,
 guide means associated with said backing plate for supporting the brake shoe assembly for sliding movement on said torque receiving arms,
 a friction pad mounted on and secured to said friction pad backing plate and
 a caliper retaining plate fixed to said backing plate and comprising first and second flexible and resilient spring clips, first and second surfaces on said first and second spring clips, respectively, for engaging the first and second caliper stops when the caliper is mounted on the pins and restraining undesired radially outward movement of said caliper by transmitting forces that would cause such movement through said friction pad backing plate to said stationary member, said retaining plate further comprising caliper engaging projections extending from a major surface of said brake shoe assembly for restraining undesired movement of said caliper in a circumferential direction by transmitting forces that would cause such movement through the backing plate to said stationary member.

22. The brake shoe assembly claimed in claim 21 and further comprising a retaining flange for engaging a portion of a caliper leg and biasing the brake shoe assembly thereagainst.

23. A caliper retaining plate for use with a brake shoe assembly for a caliper disc brake comprising a rotatable disc having an axis of rotation and an inboard and an outboard frictional surface, a rigid stationary member inboard of said disc and having two circumferentially spaced torque receiving arms axially extending above and across the periphery of the disc, first and second pin members rigidly fixed to the stationary member, a caliper slidably mounted on the pins, and first and second stops provided on the caliper,
 the brake shoe assembly comprising a friction pad backing plate, guide means associated with said backing plate for supporting the brake shoe assembly for sliding movement on said torque receiving arms, and a friction pad mounted on and secured to said friction pad backing plate, said caliper retaining plate comprising,
 means for fixing said caliper retaining plate relative to said backing plate,
 first and second spring clips including first and second surfaces, respectively, for engaging the first and second caliper stops when the caliper is mounted on the pins and restraining undesired radial movement of said caliper by transmitting forces that would cause such movement through said friction pad backing plate to said stationary member, said retaining plate further comprising caliper engaging projections extending from a major surface thereof for restraining undesired movement of said caliper in a circumferential direction by transmitting forces that would cause such movement through the backing plate to said stationary member.

24. The caliper retaining plate claimed in claim 23 and further comprising a retaining flange for engaging a portion of a caliper leg and biasing the brake shoe assembly thereagainst.

* * * * *